United States Patent [19]

Buck

[11] Patent Number: 4,471,799

[45] Date of Patent: Sep. 18, 1984

[54] LINE REMOVABLE BALL VALVE

[75] Inventor: Frank E. Buck, Tiburon, Calif.

[73] Assignee: Grove Valve and Regulator Company, Oakland, Calif.

[21] Appl. No.: 338,280

[22] Filed: Jan. 11, 1982

[51] Int. Cl.³ .............................................. F16K 43/00
[52] U.S. Cl. ................................ 137/315; 137/454.2; 251/151; 251/152; 285/18; 285/325
[58] Field of Search ...................... 285/325, 18, 24, 27; 137/315, 329, 15, 316, 454.2; 251/151, 152

[56] References Cited

U.S. PATENT DOCUMENTS

| | | | |
|---|---|---|---|
| 1,607,463 | 11/1926 | Kent | 137/316 |
| 2,955,850 | 10/1960 | Bellinger | 285/18 |
| 3,603,617 | 9/1971 | Lochridge | 285/24 |
| 3,633,598 | 1/1972 | Morris et al. | 137/15 |
| 4,019,334 | 4/1977 | Sinclair et al. | 285/18 |
| 4,285,500 | 8/1981 | Illing et al. | 137/315 |
| 4,311,163 | 1/1982 | Langevin | 137/315 |
| 4,387,735 | 6/1983 | Ripert | 137/315 |

Primary Examiner—A. Michael Chambers
Attorney, Agent, or Firm—Melvin R. Stidham

[57] ABSTRACT

A valve structure for an undersea pipeline including a valve cartridge received in a cage formed by a pair of thick parallel plates secured together by threaded studs. The studs entered in U-shaped rows down along the sides of the plate and in an arc near the bottom from side to side. There are no studs across the top. With the nuts loosened at one end of the studs, hydraulic rams, which connect the thick plates near the four corners thereof, may be extended to separate the plates slightly for removal and replacement of the valve module. Stop members prevent complete separation of the nuts from their studs.

3 Claims, 2 Drawing Figures

LINE REMOVABLE BALL VALVE

BACKGROUND OF THE INVENTION

Particularly in undersea pipeline installations, it is highly desirable to be able to remove a pipeline valve, or its internal components, for purposes of repairing and replacing same while continuing to support the pipeline during the removal and replacement operation.

Some have suggested the provision of top-entry valves wherein access to the valve internal components is gained by removal of a top closure. However, the repair of such valves requires a number of mechanical manipulations such as the removal and replacement of bolts, the main valve member and the seat ring assemblies, and such operations are not ideally performed on the ocean floor, where maneuverability and mechanical leverage are impaired and visibility is generally poor. Moreover, a part dropped in the silt and vegetation of the ocean floor may not be easily found.

There are commercially available valves of the expansible tube type, wherein a cartridge containing all of the operating parts of the valve is clamped between two line flanges which, in turn, are interconnected by threaded studs. In order to remove the cartridge from between the line flanges, the studs across the top are removed and the nuts on the remaining studs are loosened. Jacking nuts are provided on at least some of the remaining studs on the inboard side of the flanges so that they can be threaded outward to jack the line flanges apart for removal of the valve cartridge. However, in undersea operations, the seas, tides and shifting sands impose many additional forces on the pipeline which, with the removal of studs between the line flanges could impose severe stresses on the remaining studs and prevent proper realignment when the valve cartridge is replaced. Moreover, the studs and nuts removed from the valve for purposes of valve cartridge replacement, are easily lost in the silt, sands and vegetation on the ocean floor where visibility is something less than ideal.

OBJECTS OF THE INVENTION

It is an object of this invention to provide a pipeline valve, the principal components of which may be removed from the line while other members continue to support and maintain the integrity of the pipeline.

It is a further object of this invention to provide a removable ball valve for undersea service which can be removed and replaced in a minimum amount of time with a minimum number of tools.

It is a further object of this invention to provide an undersea pipeline valve wherein a valve cartridge can be removed without requiring removal of nuts, bolts or the like.

It is a further object of this invention to provide an undersea pipeline valve which can be removed from the line within the limits of operating leverage imposed on the diver under low gravity conditions.

Other objects and advantages of this invention will become apparent from the description to follow, particularly when read in conjunction with the accompanying drawings.

SUMMARY OF THE INVENTION

The valve cartridge comprises a cylindrical body band containing the main valve closure and seal rings, and end plates are secured to the body band by countersunk cap screws. The cartridge is received in a cage comprising two parallel, opposing thick steel plates secured together by studs disposed in a "U"-shaped row down the sides of the steel plate and in an arc across the bottom. Seal rings in the end plates of the valve cartridge, seal against the thick plates and with the nut loosened on, but not separated from, the studs, hydraulic rams interconnecting the four corners of the steel plates may be extended to separate them slightly for removal of the valve cartridge from between the "U" row of studs.

DESCRIPTION OF A PREFERRED EMBODIMENT

Figure 1:
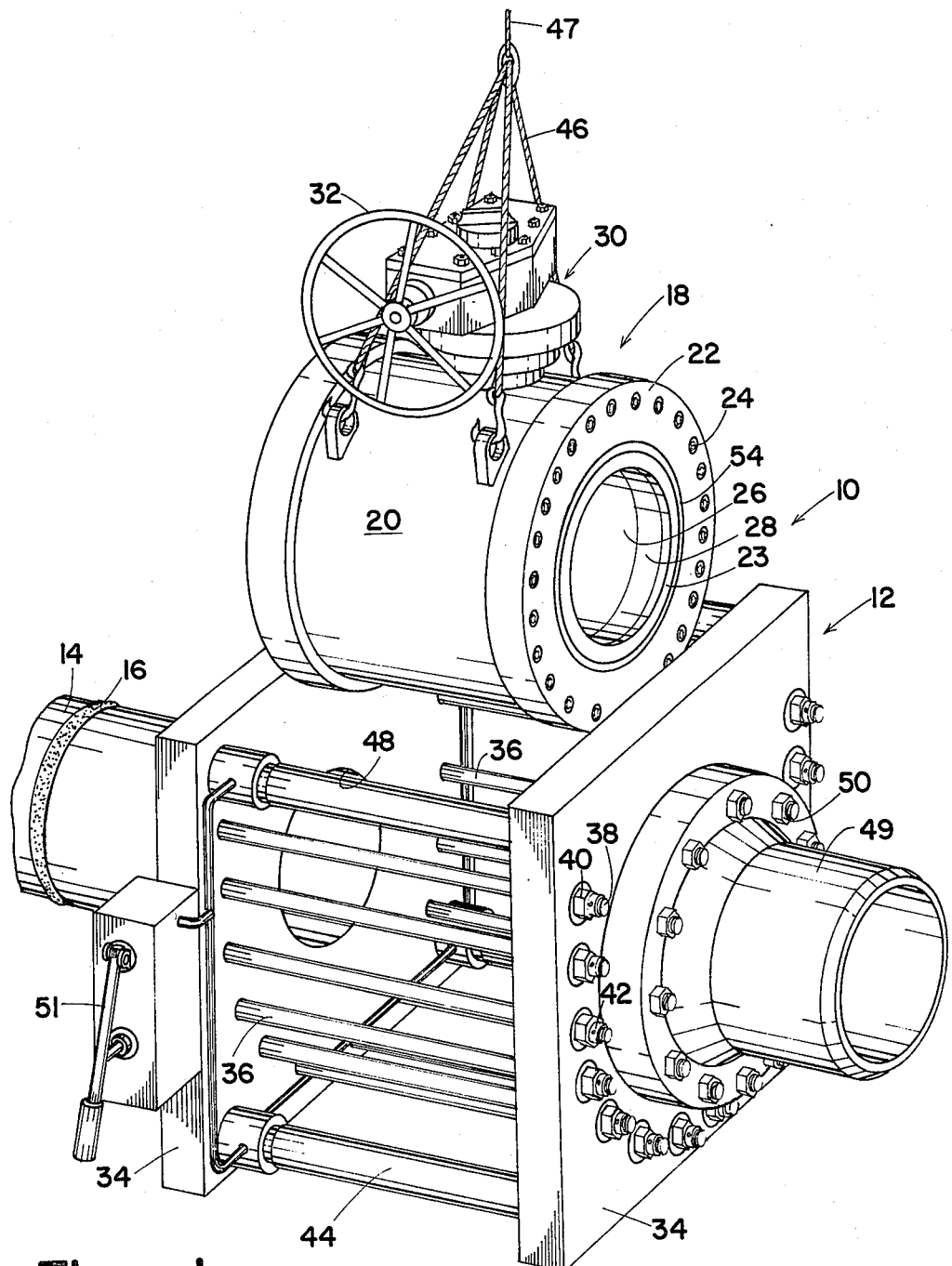
FIG. 1 is a view in perspective showing the mounting cage with the valve cartridge partially removed.

Referring now to the drawings with greater particularity, the undersea pipeline valve assembly 10 of this invention includes a cage-like structure 12, which is permanently secured to the underwater pipeline 14 as by means of welds 16, and the valve module or cartridge 18. The valve cartridge includes a valve body 20, and steel plate end closures 22 with flow passageways 23 therethrough, are secured to the body as by means of countersunk cap screws 24. Also included in the valve cartridge is the main valve closure member 26 such as a rotatable ball or plug and a suitable seat ring assembly 28 for sealing between the valve body 20 and the valve closure member 26. Any suitable valve operating means, such as a scotch yoke operator 30, including a hand wheel 32, may be mounted on the stem 33 for opening and closing the valve.

The cage 12 comprises a pair of parallel, thick steel plates 34 which are secured together by a "U" shaped row of threaded studs 36 which extend from near the top of the plates 34 down the sides thereof and in an arc across the bottom. The studs are threaded at at least one end 38 to receive nuts 40 and ferrule or similar stop means 42 are provided to limit the unthreaded movement of the nuts 40 to prevent complete separation from the studs 36.

The four corners of the thick steel plates 34 are interconnected by hydraulic rams 44 which may be extended when the nuts 40 are loosened to move the steel plates 34 apart to the extent enabled by the loosened nuts 40, leaving a small clearance 45 between the ends 22a of the valve cartridge 18 and the thick steel plates 34, enabling removal of the cartridge 18, as by means of a sling 46 attached to a line 47 from the surface.

The parallel steel plates 34 are provided with circular flow openings 48 drilled and tapped for line flanges and hubs or other suitable pipe joint connection means 49, which are bolted to the end plates at 50. Hydraulic pressure for the rams 44 to separate the plates 34 and permit removal of the cartridge 18 is provided by a manual hydraulic pump 51 with integral closed reservoir manifolded to the pressure side of the rams 44.

Figure 2:
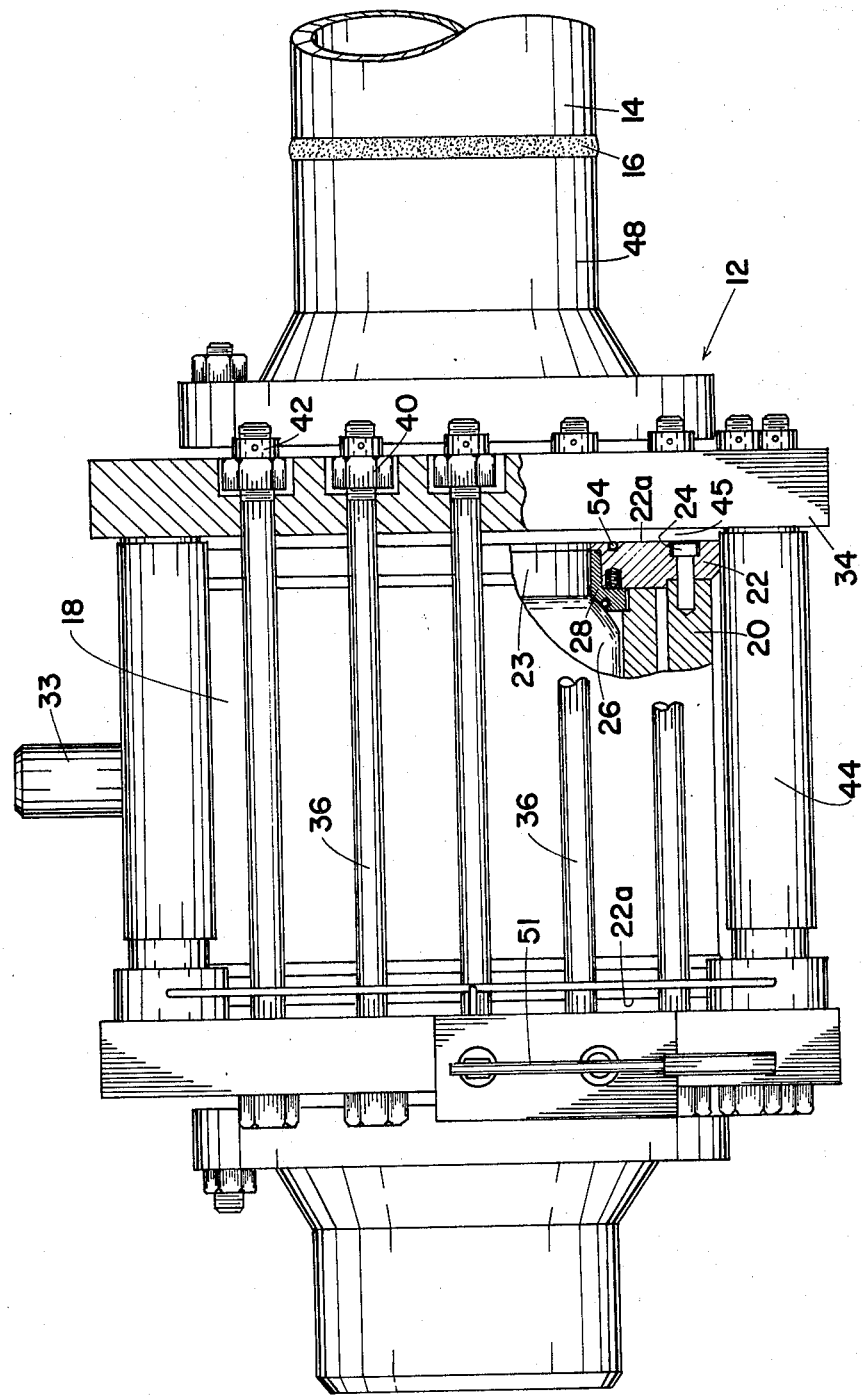
FIG. 2 is an elevation view partially in section, of the complete valve assembly.

Referring specifically to FIG. 2, the valve capsule or cartridge 18 includes all the necessary working components of the valve, including an annular body 20 and thick steel plate end closures 22 with flow passageways 23 therethrough, the end closures being secured to the body 20, by a means of cap screws 24. Countersunk recesses are provided in the end plates 22 so that the cap screw heads are wholly contained, leaving the outer surface of the end closures free. A seal ring such as an O-ring 54, is provided in the end closure 22 around and concentric with the flow passageway 23 so that, when the nuts 40 are tightened on the studs 38 the O-ring 54 seals against the inner face of the thick steel plates 34 to provide a fluid tight structure.

While this invention has been described in conjunction with a preferred embodiment thereof, it is obvious that modifications and changes therein may be made by those skilled in the art to which it pertains, without departing from the spirit and scope of this invention as defined by the claims appended hereto.

What is claimed as invention is:

1. A valve structure comprising:

a cage;

said cage being formed by a pair of parallel, thick steel plates with flow passages therethrough;

a series of studs interconnecting said thick steel plates along the sides thereof;

a nut threaded onto at least one end of each of said studs; and hub means secured to outer sides of said thick steel plates around said flow passages for installing said cage into a pipeline;

a flow control valve including;

a valve cartridge with flow passages therethrough and a movable valve closure member for blocking and unblocking said flow passages;

said valve body being receivable between the rows of studs along the sides of said steel plates;

seal rings for sealing between said valve body and said thick plates around said flow passageways; and top and bottom pairs of hydraulic rams connected between said thick plates; and a source of pressurized fluid connected to each of said rams to extend them equally and in unison for selected limited separation of said plates upon loosening of said threaded nuts said valve cartridge comprises a generally cylindrical body band;

end closure plates with flow passages therein; and an annular row of screw means securing said end closure plates to said body band, said screw means being countersunk below the outer surfaces of said end closure plates;

and including:

annular seal ring recess in each of said outer surfaces concentric with an intermediate said annular row and said flow passage;

one of said seal rings being received in each of said recesses.

2. The valve structure defined by claim 1 including:

stop means on said one ends of the studs to prevent separation of the nuts therefrom but to enable limited loosening of said nuts.

3. The valve structure defined by claim 1 wherein:

said studs are arranged in a U-shaped row down along the sides of said thick steel plates and then in an arc across the bottom thereof.

* * * * *